United States Patent
Qu et al.

(10) Patent No.: US 8,885,568 B2
(45) Date of Patent: Nov. 11, 2014

(54) POLICY APPLICATION METHOD FOR MACHINE TYPE COMMUNICATION, AND POLICY AND CHARGING ENFORCEMENT FUNCTION

(75) Inventors: Aiyan Qu, Shenzhen (CN); Chunxia Zhi, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 101 days.

(21) Appl. No.: 13/695,282

(22) PCT Filed: Mar. 9, 2011

(86) PCT No.: PCT/CN2011/071647
§ 371 (c)(1),
(2), (4) Date: Oct. 29, 2012

(87) PCT Pub. No.: WO2011/134317
PCT Pub. Date: Nov. 3, 2011

(65) Prior Publication Data
US 2013/0044646 A1    Feb. 21, 2013

(30) Foreign Application Priority Data
Apr. 29, 2010   (CN) .......................... 2010 1 0173622

(51) Int. Cl.
*H04W 4/00*   (2009.01)
*H04W 4/24*   (2009.01)
*H04M 15/00*   (2006.01)

(52) U.S. Cl.
CPC .............. *H04W 4/24* (2013.01); *H04M 15/765* (2013.01); *H04W 4/005* (2013.01)
USPC .......................................... 370/328; 455/408

(58) Field of Classification Search
None
See application file for complete search history.

(56) References Cited

U.S. PATENT DOCUMENTS

| | | | | |
|---|---|---|---|---|
| 8,086,216 B2 * | 12/2011 | Feder et al. | .................... | 455/405 |
| 8,144,591 B2 * | 3/2012 | Ghai et al. | .................... | 370/235 |
| 8,208,896 B2 * | 6/2012 | Li et al. | .................... | 455/406 |
| 8,326,263 B2 * | 12/2012 | Zhou et al. | .................... | 455/408 |
| 8,335,220 B2 * | 12/2012 | Hu et al. | .................... | 370/400 |
| 8,595,368 B2 * | 11/2013 | Baniel et al. | .................... | 709/228 |
| 8,605,583 B2 * | 12/2013 | Cutler et al. | .................... | 370/230 |
| 2006/0212924 A1 | 9/2006 | Xie et al. | | |

(Continued)

FOREIGN PATENT DOCUMENTS

CN    101291233 A    10/2008
CN    101355438 A    1/2009

OTHER PUBLICATIONS

P.R. China, State Intellectual Property Office, International Search Report for International Application No. PCT/CN2011/071647, mailed Jun. 23, 2011.

*Primary Examiner* — Anh-Vu Ly
(74) *Attorney, Agent, or Firm* — Bright IP Law Offices (57) ABSTRACT

A policy application method for Machine Type Communication (MTC) and a Policy and Charging Enforcement Function (PCEF) are provided by the disclosure. The method comprises that in a course in which an MTC device attached to a PCEF establishes an Internet Protocol-Connectivity Access Network (IP-CAN) session, the PCEF locally obtains a group policy corresponding to a device group to which the MTC device belongs (S302); the group policy is applied in the IP-CAN session (S304). The technical solution of the disclosure reduces the time required by applying the MTC policy by the PCEF, saves network resources, and increases utilization of the network resources.

17 Claims, 8 Drawing Sheets a PCEF determines a group identifier of a group to which an MTC device which requests for establishing an IP-CAN session belongs — S402 the PCEF searches, in a locally-stored corresponding relation between the group identifier and a group policy, the group policy corresponding to the group identifier — S404

(56) References Cited

U.S. PATENT DOCUMENTS

| | | | |
|---|---|---|---|
| 2009/0228956 A1* | 9/2009 | He et al. .............................. | 726/1 |
| 2011/0158090 A1* | 6/2011 | Riley et al. .................... | 370/230 |
| 2011/0167471 A1* | 7/2011 | Riley et al. ........................ | 726/1 |
| 2011/0238547 A1* | 9/2011 | Belling et al. .................. | 705/34 |
| 2011/0264726 A1* | 10/2011 | Zabawskyj et al. ........... | 709/203 |
| 2012/0023246 A1* | 1/2012 | Castro Castro et al. ...... | 709/229 |
| 2012/0064878 A1* | 3/2012 | Castro Castro et al. ...... | 455/418 |
| 2012/0084425 A1* | 4/2012 | Riley et al. .................... | 709/223 |
| 2012/0144049 A1* | 6/2012 | Lopez Nieto et al. ........ | 709/228 |
| 2012/0309346 A1* | 12/2012 | Yang et al. .................... | 455/406 |

\* cited by examiner

POLICY APPLICATION METHOD FOR MACHINE TYPE COMMUNICATION, AND POLICY AND CHARGING ENFORCEMENT FUNCTION

CROSS REFERENCE TO RELATED APPLICATIONS

This application is the U.S. National Stage of International Patent Application No, PCT/CN2011/071647 filed on Mar. 9, 2011, which claims priority to Chinese Patent Application No, 201010173622,6 filed on Apr. 29, 2010, Both the PCT Application and Chinese Application are hereby incorporated by reference in their entirety.

FIELD OF THE INVENTION

The disclosure relates to the communication field and more particularly to a policy application method for Machine Type Communication (MTC), and a Policy and Charging Enforcement Function (PCEF).

BACKGROUND OF THE INVENTION

A $3^{rd}$ Generation Partnership Project (3GPP) wireless core network comprises a General Packet Radio Service (GPRS) network, an Evolved Packet System (EPS) network, and a Universal Mobile Telecommunications System (UMTS).

Figure 1:
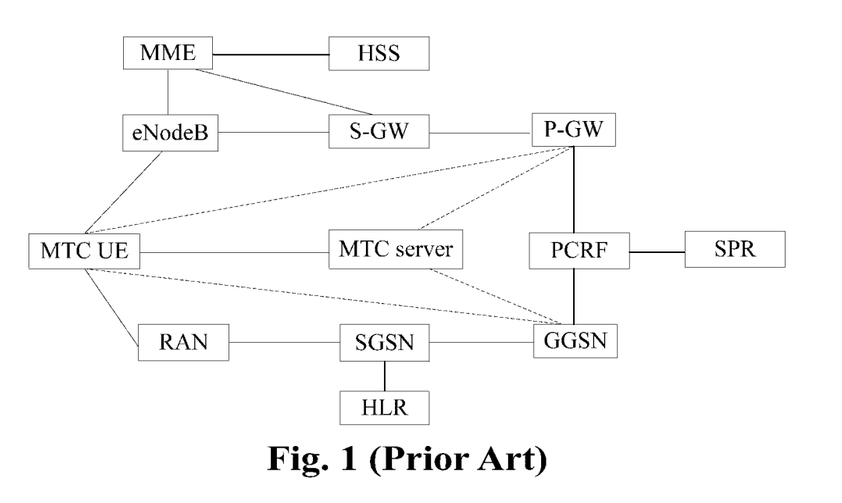
FIG. 1 is a schematic diagram illustrating an MTC device access system according to a related technology.

FIG. 1 shows a schematic diagram of an emergency call performed by a piece of MTC User Equipment (UE) to access an Internet Protocol (IP) Multimedia Subsystem (IMS) through System Architecture Evolution (SAE) and a UMTS. In FIG. 1, the solid lines represent signalings, and the dashed lines represent IP channels of the subscriber. When the access is performed through the UMTS, the UE can be also called a Mobile Station (MS).

As shown in FIG. 1, main network elements involved when the MTC UE accesses an MTC server through an EPS or a UMTS comprise: network elements of an EPS network, network elements of a UMTS network and the MTC server. In this case, the MTC UE can be also called an MTC device.

Since a 3GPP Release 7 standard system is established, a policy and charging function is realized by a Policy and Charging Control (PCC) framework. The PCC architecture is a functional framework which can be applied to various access technologies, e.g. the PCC framework can be applied to a UMTS, a Global System for Mobile Communications (GSM) an Enhanced Data rates for GSM Evolution (EDGE) radio access network, an Internetworking Wireless Local Area Network (I-WLAN) and an EPS.

Figure 2:
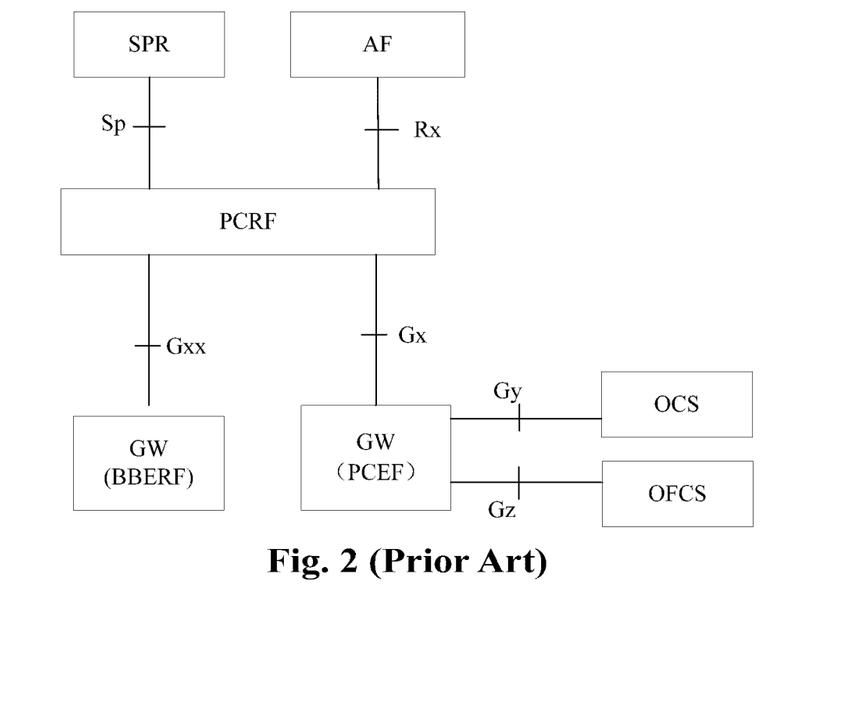
FIG. 2 is a schematic diagram illustrating a PCC structure according to a related technology.

PCC mainly realizes two major functions of policy control and charging. FIG. 2 is a schematic diagram illustrating an existing, PCC composition architecture. Each logical function entity and interface functions thereof in the PCC architecture as shown in FIG. 2 are described below.

Application Function (AF) is an access point for providing service applications. Dynamic policy control needs to be applied to network resources used by these service applications. When parameter negotiation is performed at a service plane, the AF delivers related service information to a Policy and Charging Rules Function (PCRF). If the service information is consistent with a policy of the PCRF, the PCRF accepts the negotiation; otherwise, the PCRF refuses the negotiation and provides PCRF-acceptable service parameters during a feedback process. Subsequently, the AF can return these parameters to a UE, wherein an interface between the AF and the PCRF is an Rx interface.

The PCRF is the core of the PCC and is configured to decide policies and establish charging rules. The PCRF provides a network control rule based on a service data flow, wherein the network control comprises detection of service data flows, gating control, control of Quality of Service (QoS) and data flow-base charging rules etc. The PCRF sends policies and charging rules established by the PCRF itself to a Policy and Control Enforcement Function (PCEF) to be enforced. At the same time, the PCRF further needs to ensure the consistency between these rules and subscription information of subscribers, wherein the basis for the PCRF to establish the policies and the charging rules comprises: service-related information obtained from the AF, subscriber policy and charging control subscription information which is related to policy control and charging and is obtained from a Subscription Profile Repository (SPR), and bearer-related network information obtained from the PCEF via a Gx interface.

The PCEF, usually located in a Gateway (GW), is configured to enforce, at a bearing plane, the policies and the charging rules established by the PCRF. The PCEF detects the service data flows according to a service data flow filter in the rules sent by the PCRF, and further enforces the policies and the charging rules established by the PCRF on these service data flows. When a bearer is established, the PCEF performs resource distribution according to the rules sent by the PCRF and performs gating control according to information provided by the AF. At the same time, the PCEF reports an event happening on a bearer network according to trigger of an event subscribed by the PCRF. According to the charging rules sent by the PCRF, the PCEF enforces corresponding charging operation of the service data flows, wherein the charging may be either online charging or offline charging. If it is online charging, the PCEF needs to perform credit management together with an Online Charging System (OCS). If it is offline charging, relevant charging information is exchanged between the PCEF and an Offline Charging System (OFCS). An interface between the PCEF and the PCRF is a Gx interface, an interface between the PCEF and the OCS is a Gy interface, and an interface between the PCEF and the OFCS is a Gz interface. The PCEF is generally located in a network gateway, such as an EPS Packet Data Network GW (PDN-GW), a GPRS Gateway Support Node (GGSN) in a GPRS and a Packet Data Gateway (PDG) in an I-WLAN.

A Bearer Binding and Event Reporting Function (BBERF) is generally located in an Access Network Gateway (ANG). For example, when a UE accesses an EPS through an E-UTRAN and Proxy Mobile Internet Protocol version 6 (PMIPv6) is used between a Serving Gateway (S-GW) and a Packet Data Network Gateway (P-GW), the BBERF is located in the S-GW; when the UE accesses through a trusted non-3GPP access network, the BBERF is located in a trusted non-3GPP access gateway.

The SPR stores the subscriber policy and charging control subscription information related to the policy control and charging. An interface between the SPR and the PCRF is a Sp interface.

The OCS and the PCEF together control and manage the subscriber credit under an online charging mode.

The UFCS and the PCEF together implement charging operation under an offline charging mode.

In existing techniques, an MTC device (i.e. a terminal) needs to establish an Internet Protocol-Connectivity Access Network (IP-CAN) session through an EPS or an UMTS first before accessing an MTC server. In order to realize policy and charging control for the IP-CAN session, a policy enforcement function in the EPS or the UMTS system establishes a Diameter session for each IP-CAN session with the PCRF. Through the Diameter session, the policy enforcement function reports access information of the MTC device to the PCRF, and the PCRF delivers a policy to the policy enforcement function.

The inventors found that daring practical application, there are a large number of MTC devices which need to be online for a long time; if the PCRF needs to apply for a policy applied to an IP-CAN session during an establishment process of the IP-CAN session of each MTC device, a lot of network resources will be occupied to reduce the utilization of the network resources, thus resulting in waste of the network resources.

SUMMARY OF THE INVENTION

The disclosure provides a policy application method and device for MTC to at least solve the problem.

According to an aspect of the disclosure, a policy application method for MTC provided, comprising; in a course in which an MTC device attached to a Policy and Charging Enforcement Function (PCEF) establishes an Internet Protocol-Connectivity Access Network (IP-CAN) session, the PCEF locally obtaining a group policy corresponding to a device group to which the MTC device belongs; and applying the group policy to the IP-CAN session.

Preferably, the step of the PCEF locally obtaining the group policy corresponding to the device group to which the MTC device belongs comprises: the PCEF determining a group identifier of a group to which the MTC device belongs; the PCEF searching, in a locally-stored first corresponding relation, the group policy corresponding to the group identifier, wherein the first corresponding relation is a corresponding relation between the group identifier and the group policy.

Preferably, the step of the PCEF determining the group identifier of the group to which the MTC device belongs comprises: obtaining the group identifier carried, in an IP-CAN session request message sent by the MTC device.

Preferably, the step of the PCEF determining the group identifier of the group to which the MTC device belongs comprises: obtaining a subscriber identifier of the MTC device carried in an IP-CAN session request message sent by the MTC device; and searching, in a locally-stored second corresponding relation, the group identifier corresponding to the subscriber identifier, wherein the second corresponding relation is a corresponding relation between the group identifier and the subscriber identifier.

Preferably, while the group policy is applied to the IP-CAN session, the method further comprises: the PCEF locally recording, a corresponding relation between the group policy and the IP-CAN session.

Preferably, if the PCEF tails to locally obtain the group policy corresponding to the device group to which the MTC device belongs, the PCEF requests for the group policy from a Policy and Charging Rules Function (PCRF), locally stores the group policy and applies the group policy to the IP-CAN session.

Preferably, the PCEF requests for the group policy from the PCRF by establishing a Diameter session connection between the PCEF and the PCRF; the PCRF establishes the group policy according to service information obtained from an Application Function (AF), subscriber subscription information obtained from a Subscription Profile Repository (SPR), and a subscriber identifier or a group identifier obtained from the PCEF, and delivers the group policy to the PCEF through the Diameter session connection; and after the PCEF obtains and stores the group policy, the Diameter session connection is disconnected.

Preferably, after the group policy is applied to the IP-CAN session, the method further comprises: the PCEF receiving, a re-established group policy from the PCRF, wherein the re-established group policy corresponds to the device group to which the MTC device belongs; the PCEF updating an original group policy corresponding to the device group to which the MTC device belongs according to the re-established group policy; and applying the updated group policy to all IP-CAN sessions corresponding to the device group to which the MTC device belongs.

Preferably, before the PCEF receives the re-established group policy from the PCRF, the method further comprises: the PCRF receiving a message from an AP, wherein the message carries service information corresponding to the device group; the PCRF obtaining IP-CAN session circumstances corresponding to the device group from the PCEF; and the PCRF re-establishing a group policy for the device group according to the service information and the IP-CAN session circumstances, and delivering the group policy to the PCEF.

Preferably, before the PCEF receives the re-established group policy from the PCRF, the method further comprises: the PCRF receiving a request for updating a subscription document from an SPR, wherein the request for updating the subscription document carries an updated subscription document corresponding to the device group; the PCRF obtaining IP-CAN session circumstances corresponding to the device group from the PCEF; and the PCRF re-establishing a group policy for the device group according to the updated subscription document and the IP-CAN session circumstances, and delivering the group policy to the PCEF.

According to another aspect of the disclosure, a PCEF is provided, comprising: an obtaining module, an application module and a storage module, wherein the obtaining module is configured to: in a course in which an MTC device attached to the PCEF establishes an IP-CAN session, obtain a group policy corresponding to a device group to which the MTC device belongs from a locally-set storage module, and trigger the application module; the application module is configured to apply the group policy to the IP-CAN session; and the storage module is configured to store the group policy of the device group attached to the PCEF.

Preferably, the PCEF further comprises a request module and a saving module, wherein the request module is configured to: in a case that the PCEF fails to locally obtain the group policy corresponding to the device group to which the MTC device belongs, request for the group policy from a PCRF, and trigger the saving module; the saving module is configured to save the requested group policy in the storage module, and trigger the application module; the application module is further configured to apply the requested group policy to the IP-CAN session.

Preferably, the PCEF further comprises a receiving module and an updating module, wherein the receiving module is configured to receive a re-established group policy from a PCRF, and trigger the updating module, wherein the re-established group policy corresponds to the device group to which the MTC device belongs; the updating module is configured to update an original group policy corresponding to the device group to which the MTC device belongs in the storage module according to the re-established group policy, and trigger the application module; the application module is further configured to apply the updated group policy to all IP-CAN sessions corresponding to the device group to which the MTC device belongs.

Through the disclosure, a PCEF locally stores a group policy of a device group attached to the PCEF; when an MTC device in a certain device group establishes an IP-CAN session, the PCEF locally obtains the group policy corresponding to the device group to which the device belongs; and the group policy is applied to corresponding IP-CAN session. The problem that waste of network resources is caused because the PCEF needs to apply for a policy applied to an IP-CAN session from a PCRF in a course in which each MTC device establishes the IP-CAN session in the prior art is solved, thus reducing the application time of the MTC policy, saving the network resources and increasing utilization of the network resources.

BRIEF DESCRIPTION OF THE DRAWINGS

Drawings, provided for further understanding of the present invention and forming a pan of the specification, are used to explain the present invention together with embodiments of the present invention rather than to limit the present invention, wherein.

DETAILED DESCRIPTION OF THE EMBODIMENTS

The disclosure will be described in details below with reference to the accompanying drawings and in combination with the embodiments. It should be noted that, if there is no conflict, the embodiments in the application and the characteristics in the embodiments can be combined with one another.

Embodiment 1

Figure 3:
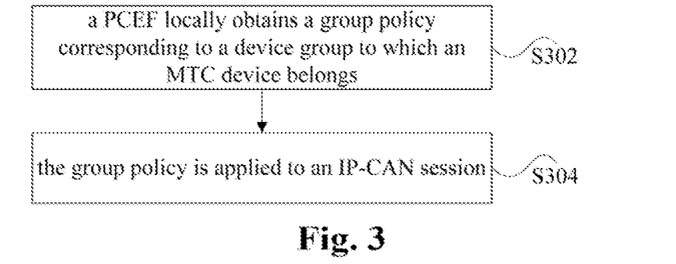
FIG. 3 is a flowchart illustrating a policy application method for MTC according to Embodiment 1 of the disclosure.

The present embodiment provides a policy application method for MTC, which can be applied, but is not limited to be applied in the PCC system as shown in FIG. 2. FIG. 3 is a flowchart illustrating, a policy application method for MTC according to Embodiment 1 of the disclosure. The method comprises:

Step 302: in a course in which an MTC device attached to a PCEF establishes an IP-CAN session, the PCEF locally obtains a group policy corresponding to a device group to which the MTC device belongs; and Step 304: the group policy is applied in the IP-CAN session.

In related technologies, in a course in which each MTC device establishes an IP-CAN session bearer, the PCEF needs to apply for a policy corresponding to the device from a PCRF and apply the policy in the IP-CAN session which is requested by the device to be established. However, policy rules of numerous MTC devices belonging to the same MTC device group are the same, e.g. all MTC devices in the group apply the same QoS rule for the same service.

Therefore, the main reason that causes a low efficiency of policy application for the MTC is that: the PCRF delivers the same policy rules fir multiple times for the same group of MTC devices.

In the method above provided by the present embodiment, the group policy of the MTC device group attached to the PCEF is stored locally in the PCEF; in the course in which the MTC device establishes the IP-CAN session, the group policy of the device group to which MTC device belongs is locally searched and obtained, and then applied to the IP-CAN session which is requested to be established. Therefore, the PCEF does not need to apply from the PCRF for a policy of the MTC device each time during the course in which the MTC establishes the IP-CAN session, thus reducing the application time of the policy, saving network resources and further increasing utilization of the network resources.

During an implementation process, the PCEF can locally configure a group policy of an MTC device group by the following methods by is not limited thereby:

(1) configure a group policy statically. i.e. a group policy of each MTC device group attached to the PCEF is configured by network equipment management personnel locally and manually;

(2) apply for/maintain a group policy dynamically, i.e. in a course in which the first MTC device of a certain MTC device group attached to the PCEF establishes an IP-CAN session, the PCEF applies for a group policy of the device group from the PCRF, and after receiving the group policy of the device group, stores the group policy in the PCEF locally.

By the methods above, the PCEF can locally store group policies of MTC device groups attached to itself, so that the PCEF does not need to apply for the policy rule for each MTC device from the PCRF during subsequent courses in which MTC devices attached to these MTC device groups establish IP-CAN sessions, thus simplifying existing MTC device policy application processes.

Preferably, during an implementation process, while performing the Step 304, the PCEF can also locally record a corresponding relation between the group policy of the MTC device group and the IP-CAN session. By doing so, dynamic maintenance of the corresponding relation between the group policy and the IP-CAN session is realized. In the case that a group policy of a certain MTC device group changes, the PCEF can apply the changed group policy in all corresponding IP-CAN sessions according to the corresponding relation above, thus ensuring normal application of MTC devices.

Embodiment 2

Methods for locally storing and maintaining a group policy by a PCEF have been described in Embodiment 1 above. The present embodiment describes a method for locally obtaining a group policy corresponding to a device group to which an MTC device belongs by a PCEF in details.

Figure 4:
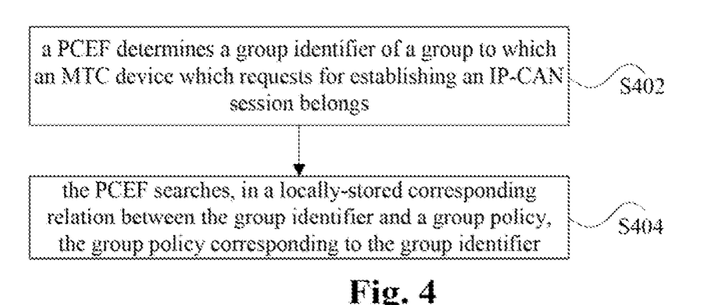
FIG. 4 is a flowchart illustrating local acquisition of a group policy by a PCEF according, to Embodiment 2 of the disclosure.

FIG. 4 is a flowchart illustrating local acquisition of a group policy by a PCEF according to Embodiment 2 of the disclosure. The process comprises:

Step 402: a PCEF determines a group identifier of a group to which an MTC device which requests for establishing an IP-CAN session belongs; and Step 404: the PCEF searches, in a locally-stored corresponding relation between the group identifier and the group policy, the group policy corresponding to the group identifier.

To make sure that the PCEF is able to locally search the group policy of the device group to which the MTC device which currently requests for establishing the IP-CAN session belongs, the PCEF can perform the local search by identifying the group identifier of the group to which the MTC device belongs. During an implementation process, the group identifier can he identified by the following methods, but is not limited thereby:

(1) the MTC device carries in an IP-CAN session establishment request message the group identifier of the device group to which the MTC device belongs, and the PCEF parses out the group identifier after receiving the IP-CAN session establishment request message;

(2) the MTC device carries a subscriber identifier or a device identifier in the IP-CAN session establishment request message; the PCEF locally maintains a corresponding relation between the subscriber identifier and the group identifier, or maintains a corresponding relation between the device identifier and the group identifier. After receiving the IP-CAN session establishment request message, the PCEF parses out the subscriber identifier or the device identifier of the device, and searches in the corresponding relations above to parse out the group identifier corresponding to the subscriber identifier or the device identifier.

By the methods above, after identifying the group identifier, the PCEF searches the group policy in the locally-stored corresponding relation between the group identifier and the group policy.

By the process above, the PCEF realizes local search of the group policy. Compared with the prior art, the searching method provided by the present embodiment replaces the technical solution that a PCEF applies for a policy from a PCRF each time an MTC device establishes an IP-CAN session. The local search of the PCEF does not need to occupy network resources for communication between the PCEF and the PCRF. In addition, the searching time is much lower than the time for message sending, receiving, processing and waiting while applying for a policy.

Embodiment 3

Embodiments 1 and 2 above respectively describe implementation methods for locally storing a group policy and locally searching the group policy by a PCEF. For an MTC device of a certain MTC device group, if a PCEF fails to find a group policy of the device group locally, a group policy of the device group needs to be added locally. The present embodiment provides a technical solution to meet such a requirement.

In a course in which an MTC device of a certain MTC device group establishes an IP-CAN session, if failing to locally obtain a group policy corresponding to the device group to which the MTC device belongs, the PCEF requests for a group policy from a PCRF, stores the group policy locally and applies the group policy to the IP-CAN session.

During an implementation process, if the PCC system as shown in FIG. 2 does not use a BBERF, it may request for the group policy by the following methods, but is not limited thereby.

Figure 5:
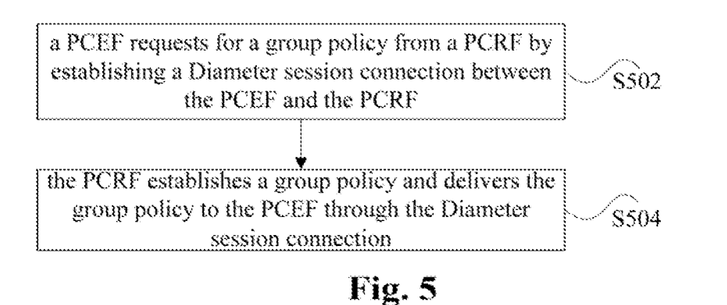
FIG. 5 is a flowchart illustrating requesting for a group policy by a PCEF according to Embodiment 3 of the disclosure.

FIG. 5 is a flowchart illustrating requesting for a group policy by a PCEF according to Embodiment 3 of the disclosure. The process comprises:

Step 502: the PCEF requests for a group policy from a PCRF by establishing a Diameter session connection With the PCRF; and Step 504: the PCRF, according to service information obtained from an AF, subscriber subscription information obtained front an SPR, and a subscriber identifier or a group identifier obtained from the PCEF, establishes a group policy and delivers the group policy to the PCEF through the Diameter session connection.

During an implementation process, if a BBERF is used in the PCC system as shown in FIG. 2, the BBERF can also store the group policy locally and search locally according to the methods provided by the embodiments above. Requesting for a group policy is implemented by the following methods, but is not limited thereby.

Figure 6:
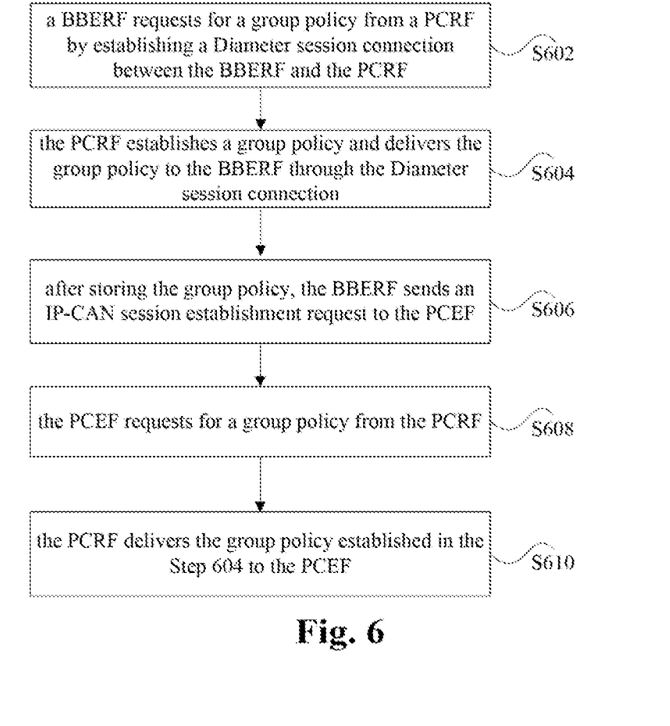
FIG. 6 is a flowchart illustrating requesting for a group policy by a BBERF according to Embodiment 3 of the disclosure.

FIG. 6 is a flowchart illustrating requesting for a group policy by a BBERF according to Embodiment 3 of the disclosure. The process comprises:

Step 602: the BBERF requests for a group policy from the PCRF by establishing a Diameter session connection between the PCEF and the PCRF;

Step 604: the PCRF establishes a group policy according to service information obtained from an AF, subscriber subscription information obtained from an SPR, and a subscriber identifier or a group identifier obtained from the PCEF, and delivers the group policy to the BBERF through the Diameter session connection;

Step 606: after storing the group policy, the BBERF sends an IP-CAN session establishment request to the PCEF;

Step 608: the PCEF requests for a group policy from the PCRF;

Step 610: the PCRF delivers the group policy established in the Step 604 to the PCEF, so as to synchronize the group policy stored by the BBERF with the group policy stored by the PCRF.

By the above technical solution provided by the present embodiment, when a device in a certain MTC device group establishes an IP-CAN session for the first time, the PCEF applies for a group policy of the MTC device group from the PCRF to locally add and maintain the group policy dynamically.

Preferably, after the PCEF applies for and stores the group policy, the Diameter session connection established for applying for the group policy can be disconnected.

In existing technologies, the Diameter session connection established for applying for the group policy needs to be always maintained. Compared with the existing technologies, the manner of disconnecting the Diameter session connection after applying for the group policy successfully does not need to occupy a communication link between the PCEF and the PCRF, thus further saving network resources.

Embodiment 4

Figure 7:
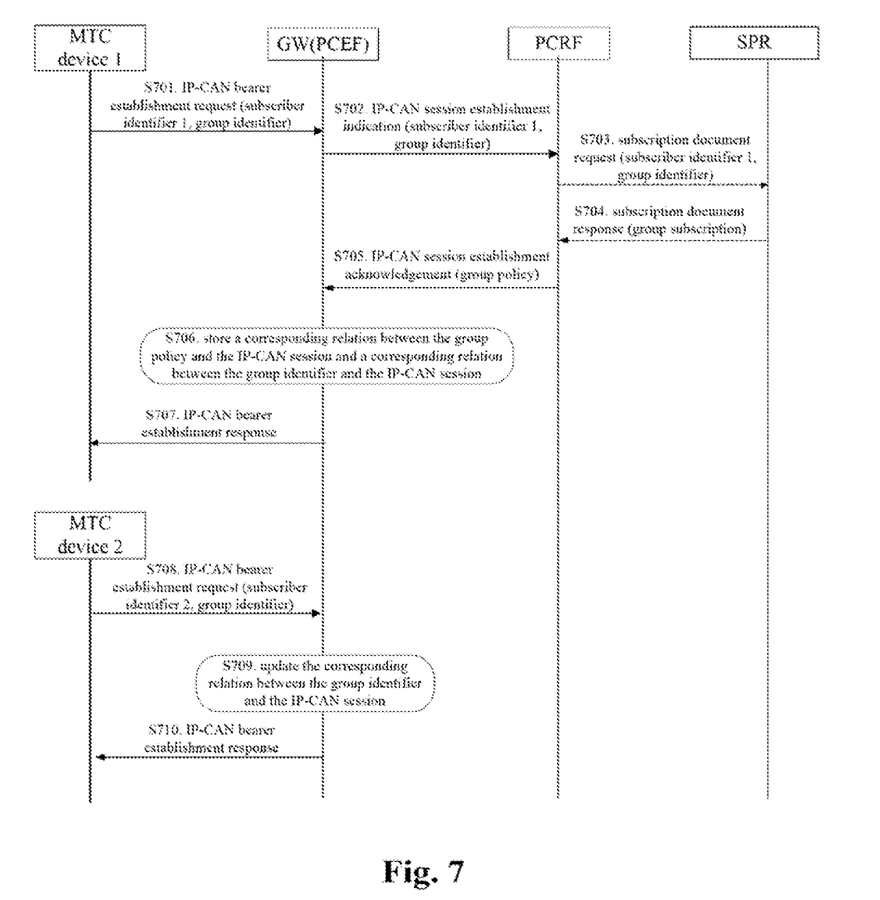
FIG. 7 is a flowchart illustrating application of a group policy according to Embodiment 4 of the disclosure.

The present embodiment describes an IP-CAN session establishment process of an MTC Device 1 and an MTC device 2 belonging to the same device group, respectively. During the session establishment process of the MTC Device 1, a PCEF interacts with a PCRF to obtain a group policy. During the session establishment process of the MTC device 2, the PCEF does not interact with the PCRF, and the session of the MTC device 2 is bound by directly using the group policy obtained through the MTC device 1, wherein a BBERF is not used in the IP-CAN session establishment of both the MTC device 1 and the MTC device 2. FIG. 7 is a flowchart illustrating application of a group policy according to Embodiment 4 of the disclosure. As shown in FIG. 7, the process comprises the following steps.

Step 701: during a course in which an MTC Device 1 establishes an IP-CAN session 1, an IP-CAN session establishment request message is sent to a PCEF, wherein the message carries a subscriber identifier 1 of the MTC Device 1 or a group identifier of the MTC Device 1.

Step 702: the PCEF sends an IP-CAN session establishment indication message to a PCRF, wherein the IP-CAN session establishment indication message carries the subscriber identifier 1 or the group identifier. A Diameter session expressed as a Gx session 1 between the PCEF and the PCRF is established by the message. In the step, the group identifier is optional. If the request message does not carry the group identifier of the MTC Device 1, the PCRF is responsible for parsing out information of the group identifier. The PCRF can parse out the group identifier corresponding to the MTC Device 1 according to a local policy.

Step 703: the PCRF sends a subscription document request to an SPR, wherein the subscription document request carries the subscriber identifier 1 or the group identifier. In the step, the information of the group identifier is optional. If the request message does not carry the group identifier, the SPR is responsible for parsing out the group identifier corresponding to the MTC Device 1.

Step 704: the SPR returns group subscription information of the MTC Device according to the group identifier or the subscriber identifier 1.

Step 705: the PCRF establishes a group policy according to the group subscription information, access information and a network policy. The PCRF sends the group policy to the PCEF through an IP-CAN session acknowledgement message, wherein the group policy comprises a group policy PCC rule and a group policy QoS rule.

Step 706: the PCEF stores a corresponding relation between the group policy and the IP-CAN session and a corresponding relation between the group identifier and the IP-CAN session.

Step 707: the PCEF enforces the policy. A GW where the PCEF locates returns an IP-CAN session establishment response message to the MTC Device 1.

Step 708: during a course in which an MTC Device 2 establishes an IP-CAN session 2, an IP-CAN session establishment request message is sent to the PCEF to request for establishing the IP-CAN session 2, wherein the message carries a subscriber identifier 2 or a group identifier of the MTC Device 2. The MTC Device 1 and the MTC Device 2 belong to the same group, thus having identical group identifiers.

Step 709: the PCEF applies the group policy in the IP-CAN session 2 and updates the corresponding relation between the group identifier and the IP-CAN session.

Step 710: the PCEF enforces the policy. The GW where the PCEF locates returns an IP-CAN session establishment response message to the MTC Device 2.

In the embodiment above, the PCEF obtains a group policy from the PCRF only when the first device in the group requests for establishing an IP-CAN bearer. When other devices in the group establish IP-CAN bearers, the PCEF applies the group policy in the IP-CAN sessions directly, and no longer requests for the group policy from the PCRF.

During the process in which the PCEF obtains the group policy from the PCRF, an IP-CAN session establishment request which may carry a group identifier or may not carry the group identifier is sent to the PCRF. If the group identifier is not carried, the PCRF or the SPR needs to be able to parse out the group identifier.

Embodiment 5

Figure 8:
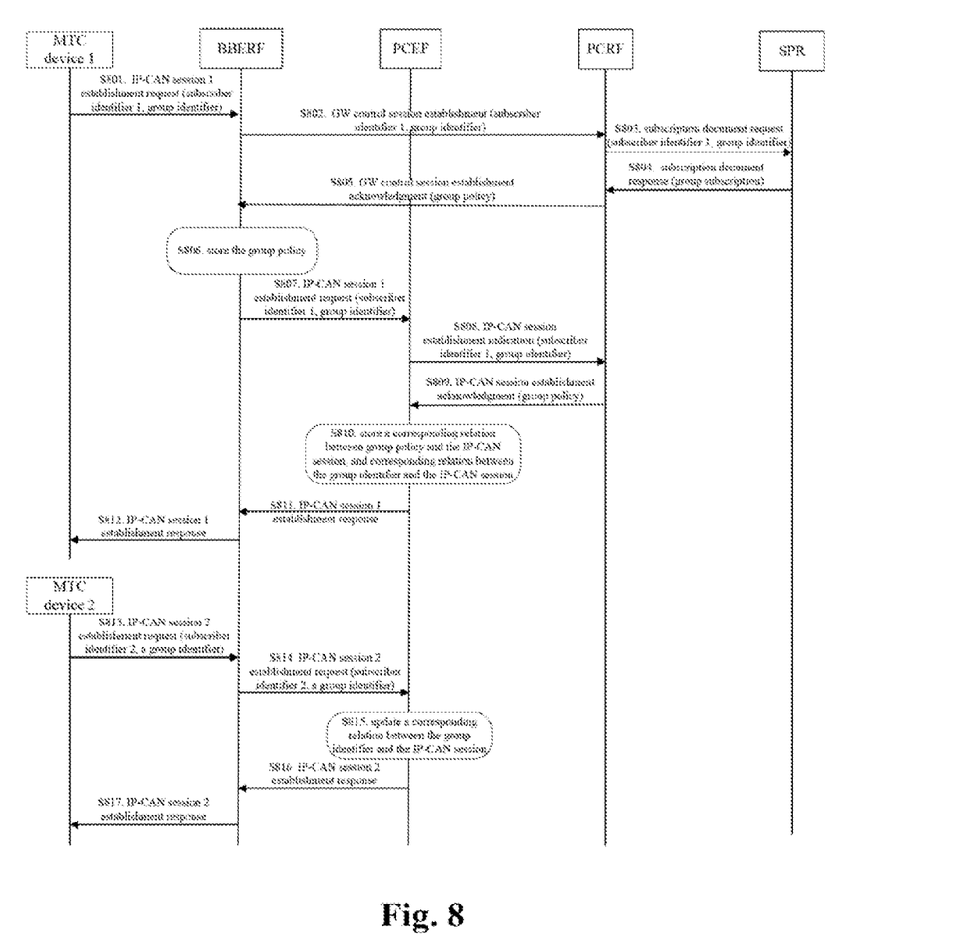
FIG. 8 is a flowchart illustrating application of a group policy according to Embodiment 5 of the disclosure.

The present embodiment describes IP-CAN session establishment processes of an MTC Device 1 and an MTC Device 2 of the same subscriber group, respectively. In the session establishment process of the MTC Device 1, a BBERF and a PCEF interact with a PCRF respectively to obtain a group policy QoS rule and a group policy PCC rule. In the session establishment process of the MTC Device 2, the BBERF and the PCEF no longer interact with the PCRF, and the session of the MTC Device 2 is bound by directly using the group policy QoS rule and the group policy PCC rule obtained through the MTC Device 1, wherein the BBERF is used in the IP-CAN session establishment of both the MTC Device 1 and the MTC Device 2. FIG. 8 is a flowchart illustrating application of group according to Embodiment 5 of the disclosure. As shown n FIG. 8, the process comprises the following steps.

Step 801: in a process in which an MTC Device 1 requests for establishing an IP-CAN session 1, an IP-CAN session establishment request message is sent to a BBERF, wherein the message carries a subscriber identifier 1 of the MTC Device 1, a PDN identifier, or a group identifier of a subscriber tamp to which the MTC Device 1 belongs.

Step 802: the BBERF sends a GW control session establishment message to a PCRF, wherein the GW control session establishment message carries the subscriber identifier 1, the PDN identifier or the group identifier. A Diameter Session (GW control session) expressed as a Gxx session 1 between the BBERF and the PCRF is established by the message.

Step 803: the PCRF sends a subscription document request to an SPR, wherein the subscription document request carries the subscriber identifier 1, the PDN identifier, or the group identifier.

Step 804: the SPR returns group subscription information according to the subscriber identifier 1 and the group identifier. Further, the SPR may deliver all group subscriber identifiers of the group to which the MTC Device 1 belongs to the PCRF. According to the information, when a device in the group establishes an IP-CAN session subsequently, the PCRF does not need to interact with the SPR.

Step 805: the PCRF establishes a group policy according to the group subscription information, access information and a network policy. The PCRF sends the group policy to BBERF. The group policy here is a group policy QoS rule.

Step 806: the BBERF stores the group policy.

Step 807: the BBERF enforces the group policy QoS rule. A GW where the BBERF locates returns an IP-CAN session 1 establishment request message to a GW where a PCEF belongs, wherein the message carries the subscriber identifier 1 or the group identifier of the MTC Device 1.

Step 808: the PCEF sends an IP-CAN session establishment indication message to the PCRF, wherein the message carries the subscriber identifier 1 or the group identifier. A diameter expressed as a Gx session 1 between the PCEF and the PCRF is established by the message.

Step 809: the PCRF associates the Gxx session 1 and the Gx session 1 according to the group identifier, and further sends the policy (besides QoS rule 1) enforced in Step 805 to the PCEF.

Step 810: the PCEF stores the group policy QoS rule and a group policy PCC rule.

Step 811: the PCEF enforces the policy. A GW where the PCEF locates sends an IP-CAN session 1 establishment response message to the GW where the BBERF locates.

Step 812: the GW where the BBERF locates returns the IP-CAN session 1 establishment response message.

Step 813: during a course in which an MTC Device 2 requests for establishing an IP-CAN session 2 an IP-CAN session establishment request message is sent to the BBERF, wherein the message carries a subscriber identifier 2 or a group identifier of the MTC Device 2. The MTC Device 1 and the MTC Device 2 belong to the same group, thus having identical group identifiers.

Step 814: the BBERF sends a GW control session establishment message to the PCEF, wherein the GW control session establishment message carries the subscriber identifier 2 or the group identifier.

Step 815: the PCEF directly applies the locally-stored group policy to the IP-CAN session 2 instead of requesting for a policy from the PCRF, and updates a corresponding relation between the group identifier and the IP-CAN session.

Step 816: the PCEF enforces the policy. The GW where the PCEF locates sends an IP-CAN session 2 establishment response message to the GW where the BBERF locates, wherein the message carries an IP Address 2.

Step 817: the GW where the BBERF locates returns the IP-CAN session 2 establishment response message.

In the embodiment above, the PCEF obtains a group policy from the PCRF only when the first device in the group requests for establishing an IP-CAN bearer. When other devices in the group establish IP-CAN bearers, the PCEF applies the group policy in the IP-CAN sessions directly, and no longer requests for a group policy from the PCRF.

During the process in which the PCEF obtains the group policy from the PCRF, an IP-CAN session establishment request which may carry a group identifier or may not carry the group identifier is sent to the PCRF. If the group identifier is not carried, the PCRF or the SPR needs to be able to parse out the group identifier.

Embodiment 6

Figure 9:
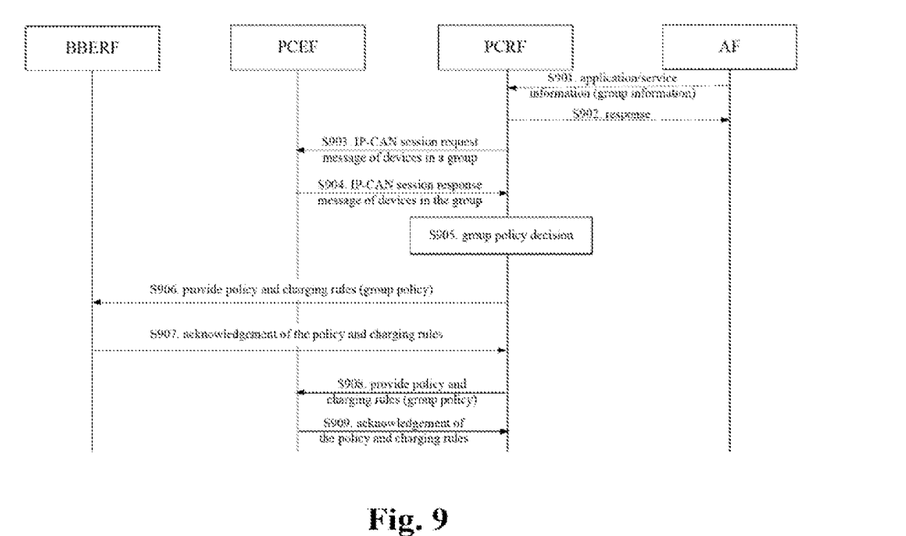
FIG. 9 is a flowchart illustrating updating of a group policy according to Embodiment 6 of the disclosure.

The present embodiment describes an IP-CAN session modification process triggered because of service access of an MTC Device 1 and an with Device 2 after an IP-CAN session is established based on Embodiment 4 or Embodiment 5. An AF may provide service group information to the PCRF, wherein the service group information can he applied to all devices in the group. Therefore, the PCRF can match the service group information according to an IP address segment, a group identifier or a subscriber number segment. FIG. 9 is a flowchart illustrating updating of a group policy according to Embodiment 6 of the disclosure. As shown in FIG. 9, the process comprises the following steps.

Step 901: an AF provides information of one service group to a PCRF, wherein a service flow is matched in the information of the service group according to a corresponding MTC device, it can be defined that the service flow is matched according to an IP address segment, a group identifier or a subscriber number segment.

Step 902: the PCRF stores the service information provided by the AF and sends a response message to the AF.

Step 903: the PCRF sends an IP-CAN session request message of devices in a group to a PCEF, wherein the message carries a group identifier.

Step 904: the PCRF returns an IP-CAN session response message of the devices in the group to the PCRF, wherein the message carries IP-CAN session circumstances in the group.

It is noted that when the device in the group establishes a bearer, a group policy is processed by the PCEF directly and is not reported to the PCRF. If the PCRF needs to establish a group policy according to the IP-CAN session circumstances in the group, the PCRF needs to request for the IP-CAN session circumstances in the group from the PCEF, which is completed according to Step 903 to Step 904.

Step 905: the PCRF performs policy decision according to the service information etc. and establishes a group policy, wherein the group policy comprises a group policy QoS rule and a group policy PCC rule.

Step 906: the PCRF sends the group policy QoS rule to a BBERF.

Step 907: the BBERF updates a local group policy QoS rule, and respectively performs a resource reservation process for existing IP-CAN sessions in the group. The BBERF sends an acknowledgement message to the PCRF.

Step 908: the PCRF sends the group policy PCC rule to the PCEF.

Step 909: the PCEF updates a local group policy PCC rule and respectively performs a resource reservation process for existing IP-CAN sessions in the group. The BBERF returns the acknowledgement message to the PCRF.

Embodiment 7

Figure 10:
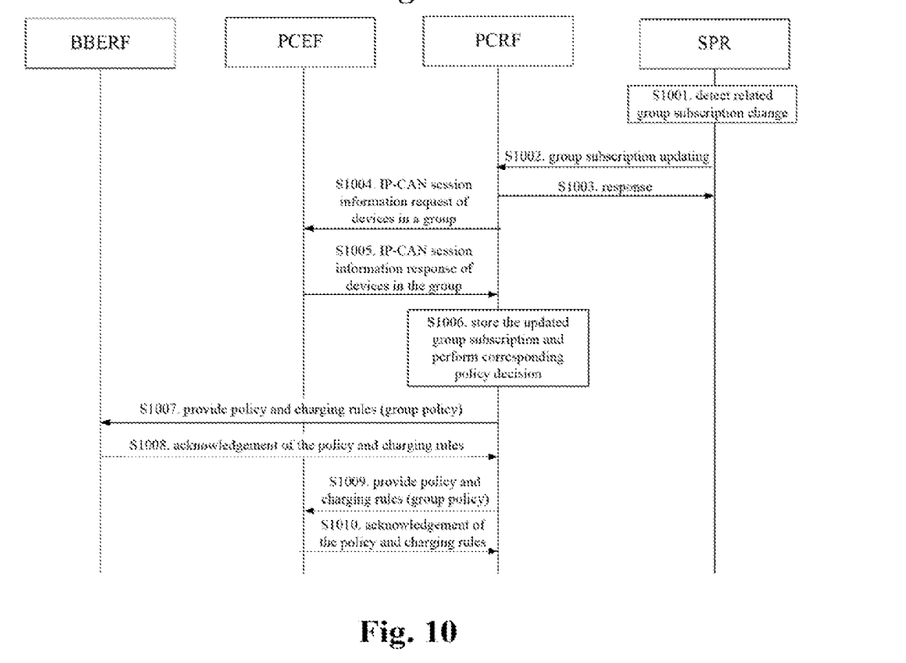
FIG. 10 is a flowchart illustrating updating of a group policy according to Embodiment 7 of the disclosure.

The present embodiment describes an IP-CAN session modification process triggered because of a change in subscription data of a subscriber group after establishing an IP-CAN session based on Embodiment 1 and Embodiment 2 and accessing a service according to Embodiment 3. FIG. 10 is a flowchart illustrating updating of a group policy according to Embodiment 7 of the disclosure. As shown in FIG. 10, the process comprises the following steps.

Step 1001: an SPR detects a change in subscription data of a subscriber group.

Step 1002: the SPR sends a group subscription updating request to a PCRF, wherein the message carries a subscription document which has been changed.

Step 1003: the PCRF stores data of the updated subscription document and sends an acknowledgement message to the SPR.

Step 1004: the PCRF sends an IP-CAN session request message of devices in a group to a PCEF, wherein the message carries a group identifier.

Step 1005: the PCEF returns an IP-CAN session response message of the devices in the group to the PCRF, wherein the message carries IP-CAN session circumstances in the group.

Step 1006: the PCRF performs policy decision according to the updated subscription document. If the QoS of a default bearer changes, the PCRF will re-establish a QoS rule and a PCC rule for a group policy.

Step 1007: the PCRF sends the group policy QoS rule to the BBERF.

Step 1008: the BBERF updates a local group policy QoS rule, and respectively performs a resource reservation process for existing IP-CAN sessions in the group. The BBERF sends an acknowledgement message to the PCRF.

Step 1009: the PCRF sends the group policy PCC rule to the PCEF.

Step 1010; the PCEF updates a local group policy PCC rule and respectively performs a resource reservation process for existing IP-CAN sessions in the group. The PCEF returns the acknowledgement message to the PCRF.

Embodiment 8

Figure 11:
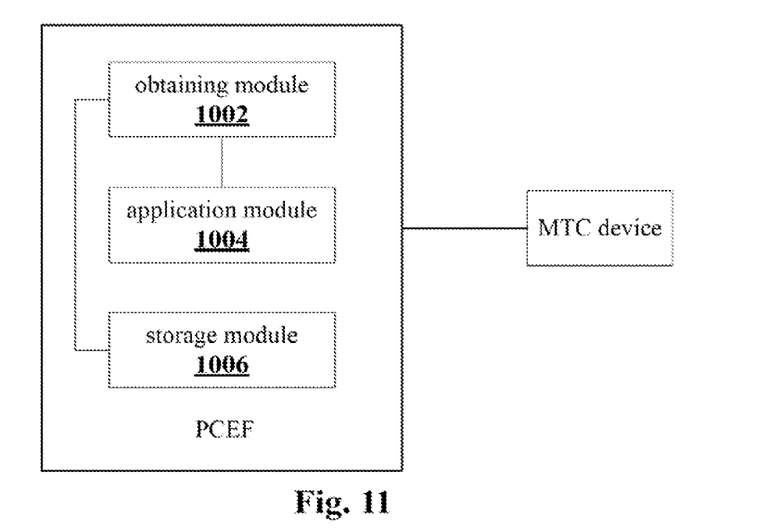
FIG. 11 is a structural block diagram of a PCEF according to Embodiment 8 of the disclosure.

The present embodiment provides a PCEF, which can be applied, but is not limited to he applied, in the PCC system as shown in FIG. 2. FIG. 11 is a structural block diagram of a PCEF according to Embodiment 8 of the disclosure. The PCEF comprises; an obtaining module 1002, an application module 1004 and a storage module 1006, wherein the obtaining module 1002 is configured to, in a course in which an MTC device attached to the PCEF establishes an IP-CAN session, obtain from the locally-set storage module 1006 a group policy corresponding to a device group to which the MTC device belongs, and trigger the application module 1004; the application module 1004 is configured to apply the group policy to the IP-CAN session; the storage module 1006 is configured to store the group policy of the device group attached to the PCEF.

The PCEF provided by the present embodiment locally stores in the PCEF the group policy of the MTC device group attached to the PCEF, in the course in which the MTC device establishes the IP-CAN session, locally searches and obtains the group policy of the device group to which the MTC device belongs, and applies the group policy in the IP-CAN session which is requested to be established, so that the PCEF does not need to apply for a policy of the MTC device each time the MTC requests to establish a IP-CAN session, thus reducing the application time of the policy, saving network resources and further increasing utilization of the network resources.

Figure 12:
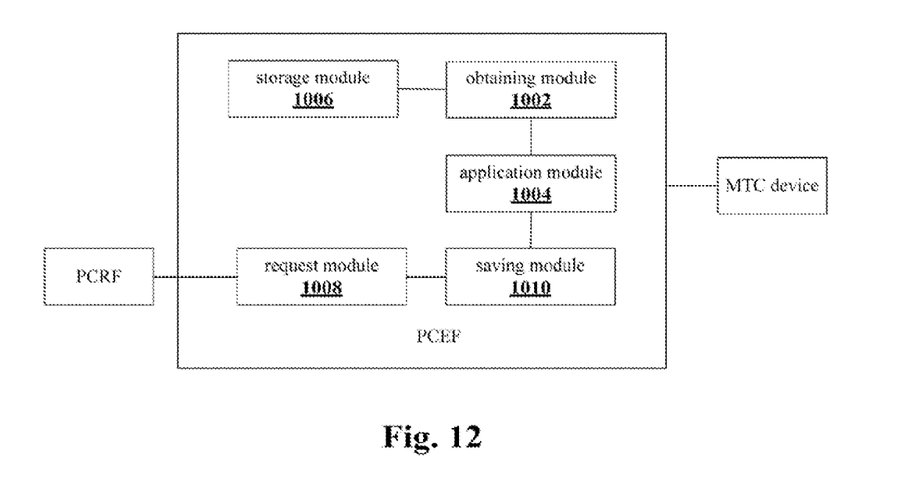
FIG. 12 is a structural block diagram of a first preferred PCEF according to Embodiment 8 of the disclosure.

FIG. 12 is a structural block diagram of a first preferred PCEF according to Embodiment 8 of the disclosure. Preferably, the PCEF can further comprise: a request module 1008 and a saving module 1010, wherein the request module 1008 is configured to, in the case that the PCEF fails to locally obtain the group policy corresponding to the device group to which the MTC device belongs, request for a group policy from a PCRF, and trigger the saving module 1010; the saving module 1010 is configured to save the requested group policy in the storage module 1006 and trigger the application module 1004; the application module 1004 is further configured to apply the requested group policy in the IP-CAN session.

When a device in a certain MTC device group establishes an IP-CAN session for the first time, the preferred PCEF above applies far a group policy of the MTC device group from the PCRF to locally and dynamically add and maintain the group policy.

Figure 13:
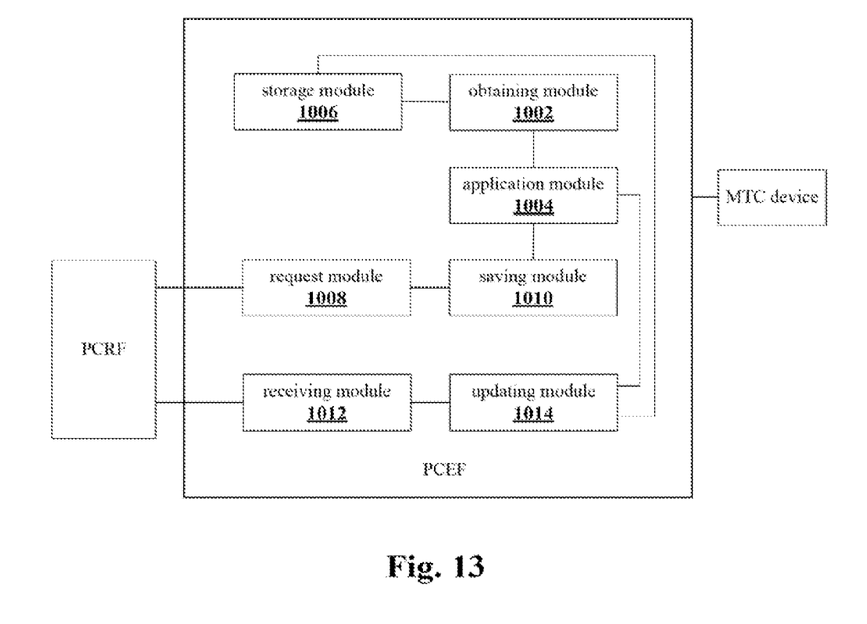
FIG. 13 is a structural block diagram of a second preferred PCEF according to Embodiment 8 of the disclosure.

FIG. 13 is a structural block diagram of a second preferred PCEF according to Embodiment 8 of the disclosure. Preferably, the PCEF can further comprise: a receiving module 1012 and an updating module 1014, wherein the receiving module 1012 is configured to receive a re-established group policy from the PCRF and trigger the updating module 1014, wherein the re-established group policy corresponds to the device group to which the MTC device belongs; the updating module 1014 is configured to update the original group policy corresponding to the device group to which the MTC device belongs in the storage module 1006 according to the re-established group policy and trigger the application module 1004; the application module 1004 is further configured to apply the updated group policy to all IP-CAN sessions corresponding to the device group to which the MTC device belongs.

After the PCRF re-establishes a group policy applied to a certain MTC device, the preferred PCEF above can receive the updated group policy in real time to locally and dynamically add and maintain the group policy.

To sum up, according to the technical solutions provided, by the embodiments of the disclosure, a PCEF locally stores a group policy of a device group attached to the PCEF; in a course in which an MTC device in the device group establishes an IP-CAN session, the PCEF locally obtains a group policy corresponding to the device group to which the MTC device belongs; and the group policy applied in a corresponding IP-CAN session. The problem that waste of network resources is caused because the PCEF needs to apply for a policy applied to an IP-CAN session from a PCRF in a course in which each MTC device establishes the IP-CAN session in the prior art is solved, thus reducing the application time of the MTC policy, saving the network resources and increasing utilization of the network resources.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A policy application method for Machine Type Communication (MTC), comprising:
   in a course in which an MTC device attached to a Policy and Charging Enforcement Function (PCEF) establishes an Internet Protocol-Connectivity Access Network (IP-CAN) session, the PCEF locally obtaining a group policy corresponding to a device group to which the MTC device belongs; and
   applying the group policy to the IP-CAN session;
   wherein if the PCEF fails to locally obtain the group policy corresponding to the device group to which the MTC device belongs, the PCEF requests for the group policy from a Policy and Charging Rules Function (PCRF), locally stores the group policy and applies the group policy to the IP-CAN session.

2. The method according to claim 1, wherein the step of the PCEF locally obtaining the group policy corresponding to the device group to which the MTC device belongs comprises:
   the PCEF determining a group identifier of a group to which the MTC device belongs;
   the PCEF searching, in a locally-stored first corresponding relation, the group policy corresponding to the group identifier, wherein the first corresponding relation is a corresponding relation between the group identifier and the group policy.

3. The method according to claim 2, wherein the step of the PCEF determining the group identifier of the group to which the MTC device belongs comprises: obtaining the group identifier carried in an IP-CAN session request message sent by the MTC device.

4. The method according to claim 3, wherein after the group policy is applied to the IP-CAN session, the method further comprises:
   the PCEF receiving a re-established group policy from the PCRF, wherein the re-established group policy corresponds to the device group to which the MTC device belongs;
   the PCEF updating an original group policy corresponding to the device group to which the MTC device belongs according to the re-established group policy; and
   applying the updated group policy to all IP-CAN sessions corresponding to the device group to which the MTC device belongs.

5. The method according to claim 2, wherein the step of the PCEF determining the group identifier of the group to which the MTC device belongs comprises:
   obtaining a subscriber identifier of the MTC device carried in an IP-CAN session request message sent by the MTC device; and
   searching, in a locally-stored second corresponding relation, the group identifier corresponding to the subscriber identifier, wherein the second corresponding relation is a corresponding relation between the group identifier and the subscriber identifier.

6. The method according to claim 5, wherein after the group policy is applied to the IP-CAN session, the method further comprises:
   the PCEF receiving a re-established group policy from the PCRF, wherein the re-established group policy corresponds to the device group to which the MTC device belongs;
   the PCEF updating an original group policy corresponding to the device group to which the MTC device belongs according to the re-established group policy; and
   applying the updated group policy to all IP-CAN sessions corresponding to the device group to which the MTC device belongs.

7. The method according to claim 2, wherein after the group policy is applied to the IP-CAN session, the method further comprises:
   the PCEF receiving a re-established group policy from the PCRF, wherein the re-established group policy corresponds to the device group to which the MTC device belongs;
   the PCEF updating an original group policy corresponding to the device group to which the MTC device belongs according to the re-established group policy; and
   applying the updated group policy to all IP-CAN sessions corresponding to the device group to which the MTC device belongs.

8. The method according to claim 1, wherein while the group policy is applied to the IP-CAN session, the method further comprises: the PCEF locally recording a corresponding relation between the group policy and the IP-CAN session.

9. The method according to claim 8, wherein after the group policy is applied to the IP-CAN session, the method further comprises:
   the PCEF receiving a re-established group policy from the PCRF, wherein the re-established group policy corresponds to the device group to which the MTC device belongs;
   the PCEF updating an original group policy corresponding to the device group to which the MTC device belongs according to the re-established group policy; and
   applying the updated group policy to all IP-CAN sessions corresponding to the device group to which the MTC device belongs.

10. The method according to claim 1, wherein
   the PCEF requests for the group policy from the PCRF by establishing a Diameter session connection between the PCEF and the PCRF;
   the PCRF establishes the group policy according to service information obtained from an Application Function (AF), subscriber subscription information obtained from a Subscription Profile Repository (SPR), and a subscriber identifier or a group identifier obtained from the PCEF, and delivers the group policy to the PCEF through the Diameter session connection; and
   after the PCEF obtains and stores the group policy, the Diameter session connection is disconnected.

11. The method according to claim 10, wherein after the group policy is applied to the IP-CAN session, the method further comprises:
   the PCEF receiving a re-established group policy from the PCRF, wherein the re-established group policy corresponds to the device group to which the MTC device belongs;
   the PCEF updating an original group policy corresponding to the device group to which the MTC device belongs according to the re-established group policy; and
   applying the updated group policy to all IP-CAN sessions corresponding to the device group to which the MTC device belongs.

12. The method according to claim 1, wherein after the group policy is applied to the IP-CAN session, the method further comprises:
   the PCEF receiving a re-established group policy from the PCRF, wherein the re-established group policy corresponds to the device group to which the MTC device belongs;
   the PCEF updating an original group policy corresponding to the device group to which the MTC device belongs according to the re-established group policy; and
   applying the updated group policy to all IP-CAN sessions corresponding to the device group to which the MTC device belongs.

13. The method according to claim 12, wherein before the PCEF receives the re-established group policy from the PCRF, the method further comprises:
   the PCRF receiving a message from an Application Function (AF), wherein the message carries service information corresponding to the device group;
   the PCRF obtaining IP-CAN session circumstances corresponding to the device group from the PCEF; and
   the PCRF re-establishing a group policy for the device group according to the service information and the IP-CAN session circumstances, and delivering the group policy to the PCEF.

14. The method according to claim 12, wherein before the PCEF receives the re-established group policy from the PCRF, the method further comprises:
   the PCRF receiving a request for updating a subscription document from a Subscription Profile Reposito (SPR), wherein the request for updating the subscription document carries an updated subscription document corresponding to the device group;
   the PCRF obtaining IP-CAN session circumstances corresponding to the device group from the PCEF; and
   the PCRF re-establishing a group policy for the device group according to the updated subscription document and the IP-CAN session circumstances, and delivering the group policy to the PCEF.

15. A PCEF, comprising: an obtaining module, an application module and a storage module, wherein
   the obtaining module is configured to: in a course in which an MTC device attached to the PCEF establishes an IP-CAN session, obtain a group policy corresponding to a device group to which the MTC device belongs from a locally-set storage module, and trigger the application module;
   the application module is configured to apply the group policy to the IP-CAN session;
   the storage module is configured to store the group policy of the device group attached to the PCEF; and the PCEF further comprising a request module and a saving module, wherein the request module is configured to: in a case that the PCEF fails to locally obtain the group policy corresponding to the device group to which the MTC device belongs, request for the group policy from a PCRF, and trigger the saving module;

the saving module is configured to save the requested group policy in the storage module, and trigger the application module;

the application module is further configured to apply the requested group policy to the IP-CAN session.

16. The PCEF according to claim 15, further comprising a receiving module and an updating module, wherein the receiving module is configured to receive a re-established group policy from a PCRF, and trigger the updating module, wherein the re-established group policy corresponds to the device group to which the MTC device belongs;

the updating module is configured to update an original group policy corresponding to the device group to which the MTC device belongs in the storage module according to the re-established group policy, and trigger the application module;

the application module is further configured to apply the updated group policy to all IP-CAN sessions corresponding to the device group to which the MTC device belongs.

17. The PCEF according to claim 15, further comprising a receiving module and an updating module, wherein the receiving module is configured to receive a re-established group policy from a PCRF, and trigger the updating module, wherein the re-established group policy corresponds to the device group to which the MTC device belongs;

the updating module is configured to update an original group policy corresponding to the device group to which the MTC device belongs in the storage module according to the re-established group policy, and trigger the application module;

the application module is further configured to apply the updated group policy to all IP-CAN sessions corresponding to the device group to which the MTC device belongs.

* * * * *